United States Patent
Liebenow et al.

[11] Patent Number: 6,131,136
[45] Date of Patent: Oct. 10, 2000

[54] DUAL MODE MODEM FOR AUTOMATICALLY SELECTING BETWEEN WIRELESS AND WIRE-BASED COMMUNICATION MODES

[75] Inventors: Frank W. Liebenow, Dakota Dunes, S. Dak.; Ajay Gupta, Sioux City, Iowa

[73] Assignee: Gateway 2000, Inc., North Sioux City, S. Dak.

[21] Appl. No.: 08/989,423

[22] Filed: Dec. 12, 1997

[51] Int. Cl.⁷ .................................................... G06F 13/14
[52] U.S. Cl. ............................ 710/131; 455/92; 455/550; 455/556; 455/557
[58] Field of Search ............................. 455/92, 550, 556, 455/557; 710/1, 131

[56] References Cited

U.S. PATENT DOCUMENTS

| | | | |
|---|---|---|---|
| 4,815,128 | 3/1989 | Malek | 380/9 |
| 4,827,498 | 5/1989 | Ross | 379/27 |
| 4,837,812 | 6/1989 | Takahashi et al. | 379/98 |
| 4,972,457 | 11/1990 | O'Sullivan | 379/59 |
| 4,991,197 | 2/1991 | Morris | 379/58 |
| 5,183,404 | 2/1993 | Aldous et al. | 439/55 |
| 5,336,099 | 8/1994 | Aldous et al. | 439/131 |
| 5,338,210 | 8/1994 | Beckham et al. | 439/131 |
| 5,353,334 | 10/1994 | O'Sullivan | 379/59 |
| 5,361,296 | 11/1994 | Reyes et al. | 379/96 |
| 5,367,563 | 11/1994 | Sainton | 379/98 |
| 5,408,520 | 4/1995 | Clark et al. | 379/93 |
| 5,606,594 | 2/1997 | Register et al. | 379/58 |
| 5,802,460 | 9/1998 | Parvulescu et al. | 455/92 |
| 5,802,483 | 9/1998 | Morris | 455/557 |

*Primary Examiner*—Thomas C. Lee
*Assistant Examiner*—Abdelmoniem Elamin
*Attorney, Agent, or Firm*—Schwegman, Lundberg, Woessner & Kluth, P.A.; Joseph Lee

[57] ABSTRACT

A dual modem automatically switches between a wireless and wire-based communication modes using mode selection circuitry that detects when a wire-based communications network, such as a standard land-line telephone network, is coupled to the modem. When the modem selection circuitry detects the presence of the wire-based communications network, it couples modem processing circuitry to a wire-based interface. When the modem selection circuitry fails to detect the presence of the wire-based communications network, it couples the modem processing circuitry to a wireless interface and the wireless interface is also powered for coupling to a wireless communications network, such as a cellular phone network. The wireless interface is not powered when the modem is coupled to the wire-based communications network.

17 Claims, 3 Drawing Sheets

DUAL MODE MODEM FOR AUTOMATICALLY SELECTING BETWEEN WIRELESS AND WIRE-BASED COMMUNICATION MODES

FIELD OF THE INVENTION

The present invention is related to computer modems and in particular to modems capable of interfacing with land-line and wireless communications networks.

BACKGROUND OF THE INVENTION

With the advent of wireless modems, portable computer users are no longer dependent on land-line based phone systems and are able to communicate electronically wherever there is a wireless transmitter within range. Nonetheless, for those occasions when no wireless communications are available, many modem manufacturers include a conventional land-line phone jack in the modem so the user can still connect to a communications network. However, switching the mode of the modem between the wireless and the conventional phone connection is performed manually by the user. In addition, the user must also remember to manually power down the wireless interface when connecting through a land-line or risk running down the battery in the portable computer.

Therefore, there is a need for a modem that conveniently switches between wireless communication and land-line based communication depending on the availability of a land-line connection. Furthermore, there is also a need for a modem that automatically powers down when attached to a land-line based communication network to conserve battery power.

SUMMARY OF THE INVENTION

A dual modem automatically switches between a wireless and wire-based communication modes using mode selection circuitry that detects when a wire-based communications network, such as a standard land-line phone network, is coupled to the modem. When the wire-based communications network is coupled to the modem, the modem selection circuitry couples modem processing circuitry to a wire-based interface. When the wire-based communications network is not coupled to the modem, the modem selection circuitry couples the modem processing circuitry to a wireless interface. The wireless interface is powered for coupling to a wireless communications network, such as a cellular phone network, when the wired interface is not coupled to the wire-based communications network. The wireless interface is not powered when the modem is coupled to the wire-based communications network. The mode selection circuitry comprises switching circuitry coupled to detection circuitry, and the selection circuitry selectively couples the modem processing circuitry to the wire-based or wireless communication network based on a signal from the detection circuitry. In one aspect of the invention, the detection circuitry is a physical switch; in another aspect, the detection circuitry is an electrical switch.

A method of automatically selectively coupling the modem processing circuitry to the wireless and wire-based communications networks is also described, as is a communications system comprising a computer and the dual mode modem of the present invention.

Thus the dual mode modem of the present fulfills the need for a modem that conveniently selects between wireless communication and land-line based communication depending on the availability of a land-line connection. Furthermore, the dual mode modem of the present invention automatically powers down the wireless interface when the modem is connected to a land-line network, conserving battery power. Both of the functions are performed without intervention by the user, making the dual mode modem of the present invention more easy to use than previously available dual mode modems.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

The leading digit(s) of reference numbers appearing in the Figures corresponds to the Figure number, with the exception that the same reference number is used throughout to refer to an identical component which appears in multiple Figures. Signals and connections may be referred to by the same reference number or label, and the actual meaning will be clear from its use in the context of the description.

Figure 1:
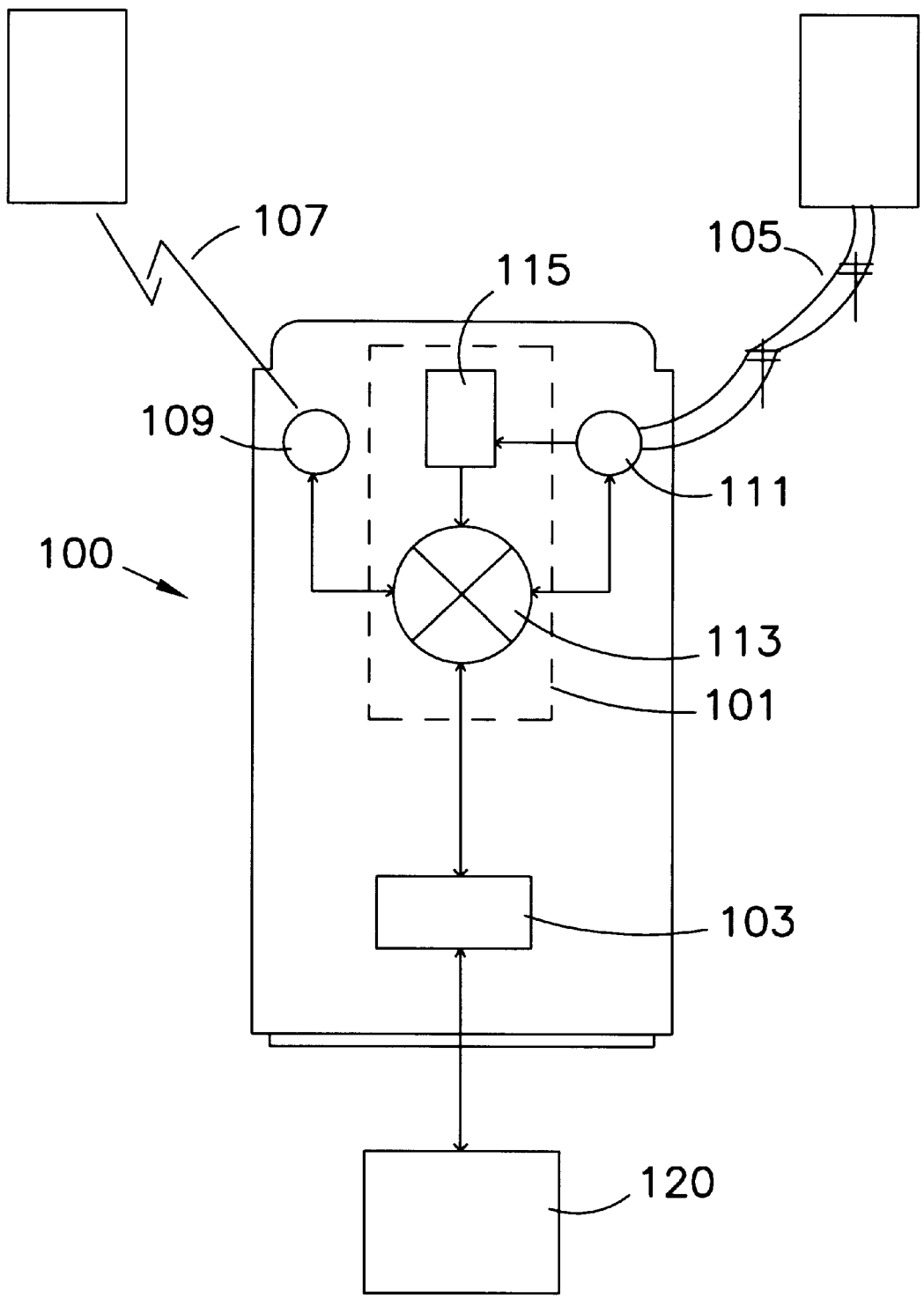
FIG. 1 is a block diagram of land-line mode selection circuitry in a dual mode modem for selecting between wired and wireless connection modes.

FIG. 1 shows a block diagram of mode selection circuitry 101 in a dual mode modem 100 for selecting input and output data for the modem processing circuitry 103 between a wire-based communications network 105, shown generically in FIG. 1 as a conventional land-line phone system, and a wireless communications network 107. The wireless communications network 107 is described as transmitting and receiving data through radio waves used in cellular phone communications, but the wireless communications network 107 can use other portions of the electromagnetic spectrum as well be apparent to one skilled in the art. The modem 100 couples to a computer 120 for sending and receiving computer data through the connected network.

The modem 100 couples to the wireless communications network 107 through a wireless interface 109. The wireless interface includes, at a minimum, a transmitter/receiver capable of processing the portion of the spectrum used by the wireless communications network 107. A transmitter/ receiver suitable for operation in conjunction with the mode selection circuitry 102 is exemplified by that incorporated in a wireless modem such as the TelePort K56Flex Modem/Ethernet PC Card. The substitution of other wireless transmitters/receivers will be readily apparent to those skilled in the art.

The modem 100 is connected to the wire-based communications network through a wired interface 111. The interface 111 can include any of many commonly available phone jacks, as shown in later Figures. Any of the well-known local area network connectors can also be incorporated into the modem 100 as part of interface 111.

The mode selection circuitry 101 is shown in FIG. 1 as consisting of switching circuitry 113 and detection circuitry 115. The detection circuitry 115 detects whether the modem is attached to the wire-based communications network 105 or to the wireless communications network 107 as discussed in more detail below. When the detection circuitry 115 detects that the modem is attached to the wire-based communications network 105, it signals the switching circuitry 113 to couple the input and output data lines to the wired interface 111. The wired interface 111 draws power through its attachment to the wire-based communications network 105. When the detection circuitry 115 detects the modem is not attached to the wire-based communications network 105, it signals the switching circuitry 113 to couple the input and output data lines of the modem processing circuitry 103 to the wireless interface 109. The wireless interface 109 draws power from the computer 120 through the modem processing circuitry 103 as is known in the art.

Although the switching circuitry 113 and the detection circuitry are shown in FIGS. 1–5 as separate components, combining the functions of the switching circuitry 113 and the detection circuitry 115 into a single circuit will be apparent to those skilled in the art as an alternate embodiment within the scope of the invention. FIGS. 2–5 show further alternate embodiments for the detection circuitry 115.

Figure 2:
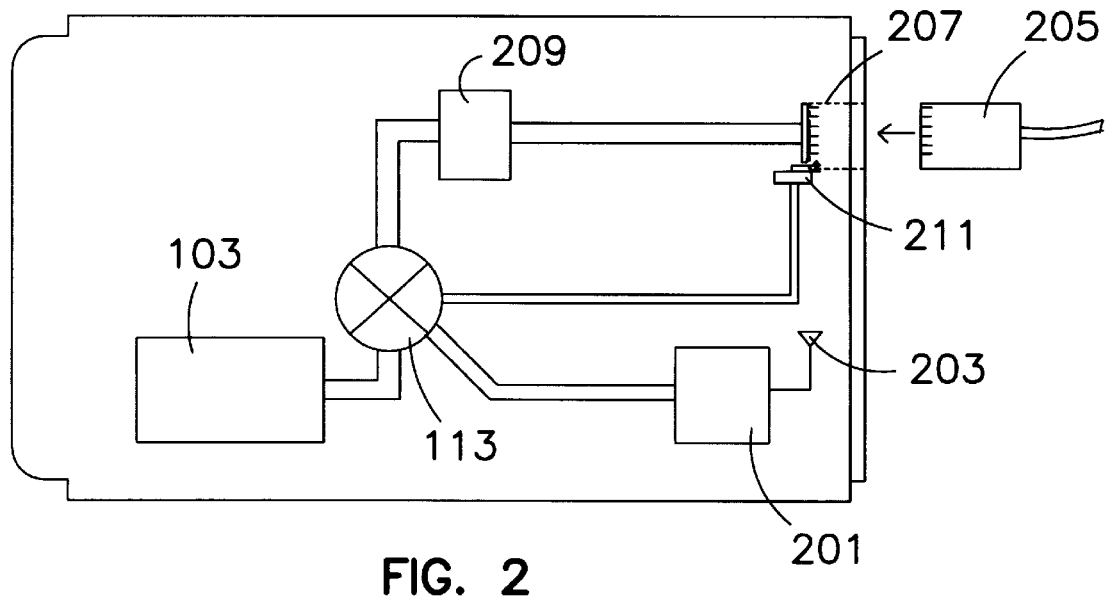
FIG. 2 is a block diagram of one embodiment of the mode selection circuitry having a microswitch that detects the insertion of a land-line phone cord.

FIG. 2 shows an embodiment of the mode selection circuitry 101 that uses a microswitch 211 as the detection circuitry 115. The microswitch 211 is coupled to the switching circuitry 113. The microswitch 211 is depressed by the insertion of a land-line phone cord plug 205 into a phone jack connector 207. The phone cord plug 205 is manufactured to depress the microswitch 211. When the microswitch is depressed, a signal is sent to the switching circuitry 113 which selects the input and output data lines from the wired interface 111 to couple to the input and output data lines of the modem processing circuitry 103. FIG. 2 also illustrates a DAA (data access arrangement) 209 required to process analog signals transmitted over a standard land-line phone system. When the phone cord 205 is removed from connector 207, the microswitch is no longer depressed, and the switching circuitry 113 selects the input and output data lines from the wireless interface 201 as the input and output data lines for the modem processing circuitry 103.

As shown in FIG. 2, the wireless interface 109 comprises a transmitter/receiver, generically illustrated as antenna 203, coupled to a signal processor 201. The signal processor 201 converts between the electromagnetic signals native to the wireless communications network 107 and computer data that can be understood by the modem processing circuitry 103.

Figure 3:
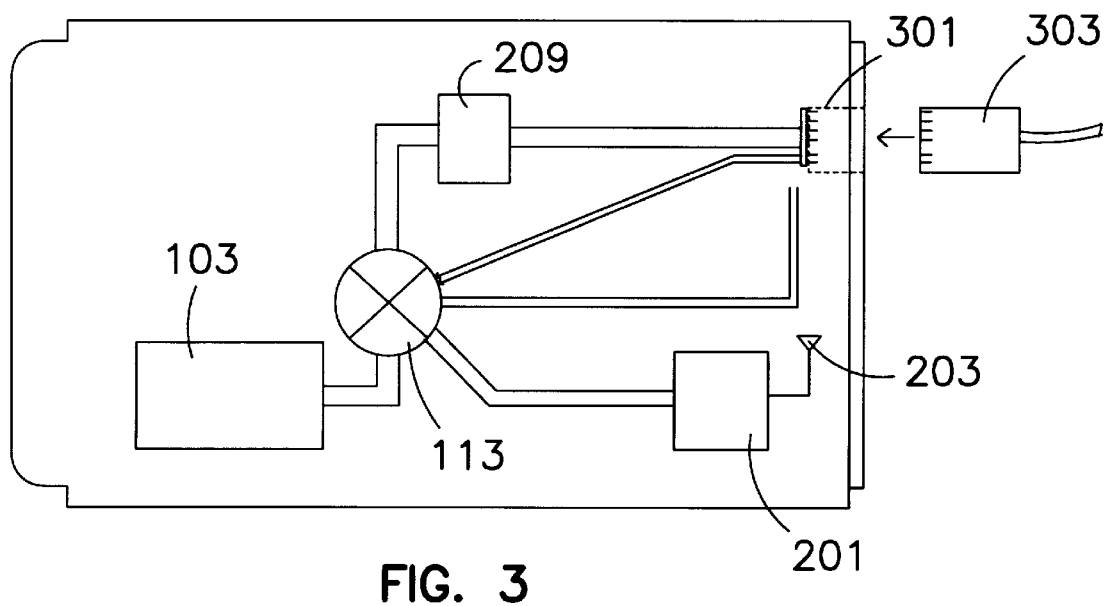
FIG. 3 is a block diagram of an alternate embodiment of the mode selection circuitry having an electrical contact that detects the insertion of a land-line phone cord.

An alternate embodiment is illustrated in FIG. 3. The components of FIG. 3 correspond to those in FIG. 2 except that two of the pins in a standard 4-wire phone jack 301 comprise the detection circuitry 115. A phone cord plug 303 has two corresponding pins shorted together so that an electrical signal is sent to the switching circuitry 113 when the plug 303 is inserted into the phone jack 301. The use of more or fewer pins to signal the switching circuitry 113 that the plug has been inserted will be recognized by those skilled in the art, as will the substitution of phone jacks and cord plugs of different configurations.

Figure 4:
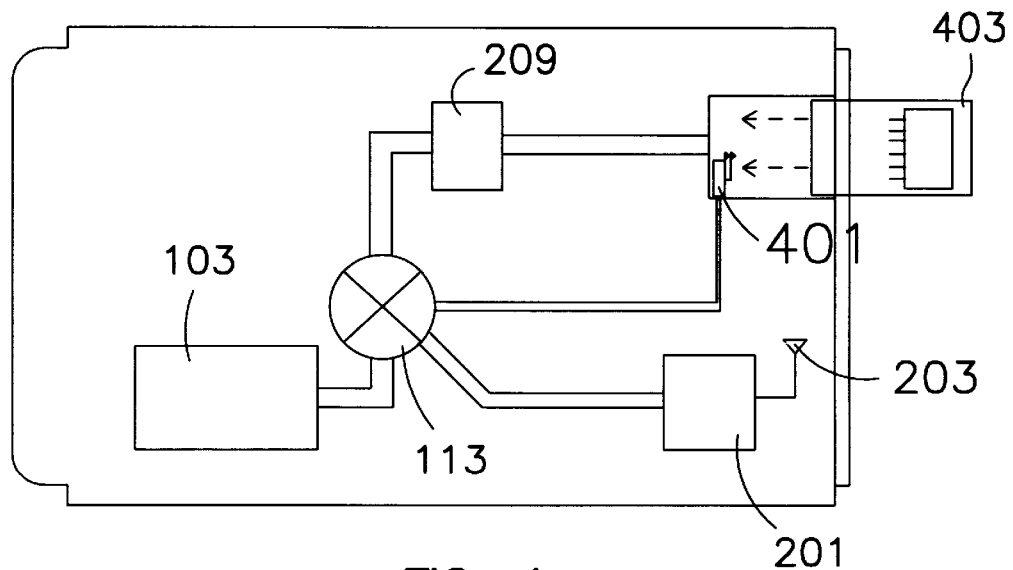
FIG. 4 is a block diagram of a further embodiment of the mode selection circuitry in FIG. 2 having a land-line phone jack that extends for connection to a land-line phone cord.

FIG. 4 is a further embodiment of the mode selection circuitry shown in FIG. 2 in that a microswitch 401 is used to signal the switching circuitry 113 to couple the input and output data lines of the wired communications network to the modem processing circuitry 103. However in the embodiment shown in FIG. 4, the microswitch 401 is activated when a retractable phone jack 403, such as an X-Jack manufactured by Megahertz Inc., is extended so that a phone line can be inserted.

Figure 5:
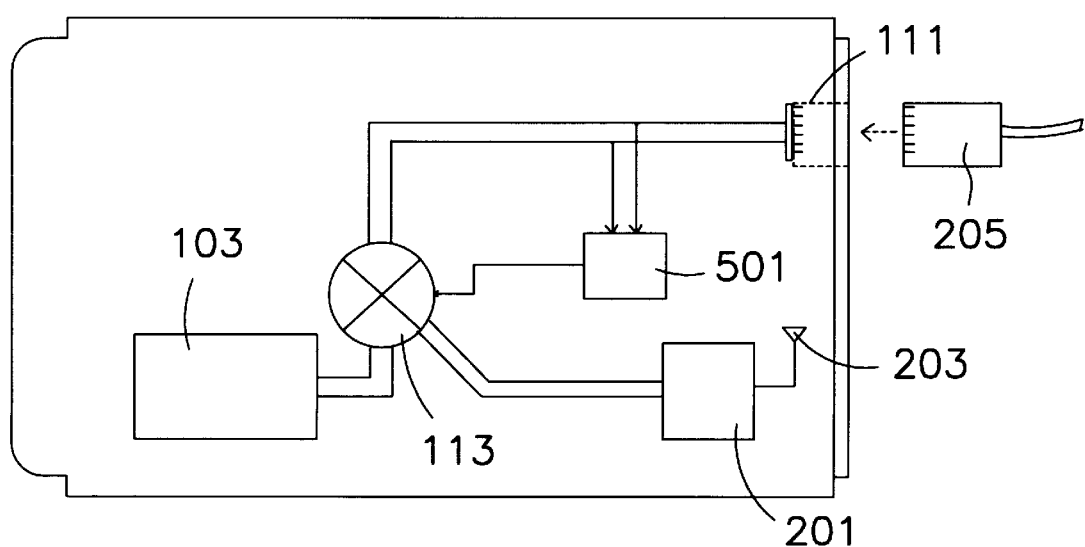
FIG. 5 is a block diagram of yet another alternate embodiment of the mode selection circuitry that detects loop current when the modem is connected to a land-line phone system.

Detection circuitry 501 shown in FIG. 5 is coupled to the wired interface 111 so that it can detect the telephone company's loop current which is present when a phone line is connected to the interface 111. When the detection circuitry 501 detects the presence of the loop current, it sends a signal to the switching circuitry 113 to couple the modem input and output lines to those of the wired interface 111. As will be readily apparent to one skilled in the art, any of the well-known devices having the capability of detecting the presence or absence of an electrical current are suitable for use as detection circuitry 501 and are within the scope of the invention.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A dual mode modem for automatically selecting between wireless and wire-based communication modes, the modem comprising:

mode selection circuitry coupled to modem processing circuitry;

a wired interface selectively coupled to a wire-based communications network and further coupled to the mode selection circuitry; and a wireless interface selectively coupled to a wireless communications network and further coupled to the mode selection circuitry, wherein the mode selection circuitry routes data between the modem processing circuitry and the wired interface when the wired interface is coupled to the wire-based communications network, and routes data between the modem processing circuitry and the wireless interface when the wired interface is not coupled to the wire-based communications network.

2. The modem of claim 1, wherein the wireless interface is powered for coupling to the wireless communications network when the wired interface is not coupled to the wire-based communications network and not powered when the wired interface is coupled to the wire-based communications network.

3. The modem of claim 1, wherein the mode selection circuitry comprises switching circuitry coupled to detection circuitry, wherein the switching circuitry selectively couples the modem processing circuitry to the wired interface or the wireless interface based on a signal from the detection circuitry.

4. The modem of claim 3, wherein the detection circuitry comprises a physical switch that signals the switching circuitry to couple the modem processing circuitry to the wired interface when a phone cord is coupled to the wired interface.

5. The modem of claim 3, wherein the detection circuitry comprises an electrical switch that signals the switching circuitry to couple the modem processing circuitry to the wired interface when a phone cord is coupled to the wired interface.

6. The modem of claim 1, wherein the wired interface comprises a phone jack.

7. The modem of claim 6, wherein the phone jack has extended and retracted positions.

8. The modem of claim 7, wherein the mode selection circuitry couples the modem processing circuitry to the wired interface when the phone jack is in the extended position.

9. The modem of claim 1, wherein the mode selection circuitry detects the presence of a loop current in the wired interface when the wired interface is coupled to the wire-based communications network and further couples the modem processing circuitry to the wired interface when the loop current is present.

10. The modem of claim 1, wherein the wireless interface comprises a transmitter and a receiver suitable for transmitting and receiving radio waves used in cellular phone communications, and a signal processor for converting between the radio waves and computer data.

11. A method of automatically selectively coupling modem processing circuitry in a modem to wireless and wire-based communications networks comprising the steps of:

detecting if a wired interface in the modem is coupled to the wire-based communications network;

coupling the modem processing circuitry to the wired interface upon detecting the wire-based communications network; and coupling the modem processing circuitry to a wireless interface for further coupling to the wireless communications network upon failing to detect the wire-based communications network.

12. The method of claim 10, further comprising the steps of:

supplying power to the wireless interface when the wire-based communications network is not detected; and not supplying power to the wireless interface when the wire-based communications network is detected.

13. A communications system comprising:

a computer having a communications port;

a modem coupled to the communications port for transferring data from the computer to wireless and wire-based communications networks, the modem comprising:

mode selection circuitry coupled to modem processing circuitry;

a wired interface selectively coupled to a wire-based communications network and further coupled to the mode selection circuitry; and a wireless interface selectively coupled to a wireless communications network and further coupled to the mode selection circuitry, wherein the mode selection circuitry routes data between the modem processing circuitry and the wired interface when the wired interface is coupled to the wire-based communications network, and routes data between the modem processing circuitry and the wireless interface when the wired interface is not coupled to the wire-based communications network.

14. The communications system of claim 13, wherein the wireless interface is powered by a power supply in the computer for coupling to the wireless communications network when the wired interface is not coupled to the wire-based communications network and not powered by the power supply when the wired interface is coupled to the wire-based communications network.

15. The communication system of claim 13, wherein the mode selection circuitry comprises switching circuitry coupled to detection circuitry, wherein the switching circuitry selectively couples the modem processing circuitry to the wired interface or the wireless interface based on a signal from the detection circuitry.

16. The communication system of claim 13, wherein the mode selection circuitry detects the presence of a loop current in the wired interface when the wired interface is coupled to the wire-based communications network and further couples the modem processing circuitry to the wired interface when the loop current is present.

17. The communication system of claim 13, wherein the wireless interface comprises a transmitter and a receiver suitable for transmitting and receiving cellular phone signals.

* * * * *